(12) United States Patent
Mayer

(10) Patent No.: US 7,650,822 B2
(45) Date of Patent: Jan. 26, 2010

(54) MACHINING APPARATUS FOR MAKING A PLASTICIZING BARREL

(75) Inventor: Ludwig Mayer, Moorenweis (DE)

(73) Assignee: KraussMaffei Technologies GmbH, München (DE)

( * ) Notice: Subject to any disclaimer, the term of this patent is extended or adjusted under 35 U.S.C. 154(b) by 349 days.

(21) Appl. No.: 11/625,029

(22) Filed: Jan. 19, 2007

(65) Prior Publication Data
US 2007/0116791 A1    May 24, 2007

Related U.S. Application Data

(63) Continuation of application No. PCT/EP2005/053514, filed on Jul. 20, 2005.

(30) Foreign Application Priority Data

Jul. 24, 2004    (DE) ...................... 10 2004 036 078

(51) Int. Cl.
*B29C 47/66*    (2006.01)
*B29C 47/58*    (2006.01)

(52) U.S. Cl. ........................................... 82/1.11; 82/46

(58) Field of Classification Search .................. 82/1.11, 82/148, 1.4, 46, 47, 53, 59; 425/200, 202
See application file for complete search history.

(56) References Cited

U.S. PATENT DOCUMENTS 2,638,802 A    5/1953    Froussard 3,398,435 A  *  8/1968    Nouel .......................... 425/166
3,650,656 A  *  3/1972    Schmid ........................ 425/526
3,929,044 A  *  12/1975  Beauchet ........................ 82/46
6,607,299 B1 *  8/2003    Bacher et al. .................. 366/87

FOREIGN PATENT DOCUMENTS

| CH | 462 593 A | 9/1968 |
|----|-----------|--------|
| DE | 662 199 C | 7/1938 |
| DE | 23 53 707 | 4/1975 |
| EP | 0 426 101 A | 5/1991 |

* cited by examiner

*Primary Examiner*—Will Fridie, Jr.
(74) *Attorney, Agent, or Firm*—Henry M. Feiereisen; Ursula B. Day

(57) ABSTRACT

A machining apparatus for making a plasticizing barrel includes a clamping device for securing the plasticizing barrel, with the clamping device constructed for rotation about a rotation axis and for off-center acceptance of the plasticizing barrel to thereby cause the plasticizing barrel to wobble about its symmetry axis, when the clamping device rotates. The clamping device interacts with a machining unit to provide the plasticizing barrel with an internal conical bore for receiving a screw. The machining unit has a turning tool which is movable linearly back-and-forth in a direction of an axis which extends in relation to the rotation axis at an incline of about half a cone angle of the conical bore, wherein the conical bore being produced has a center line which coincides with the rotation axis.

22 Claims, 7 Drawing Sheets

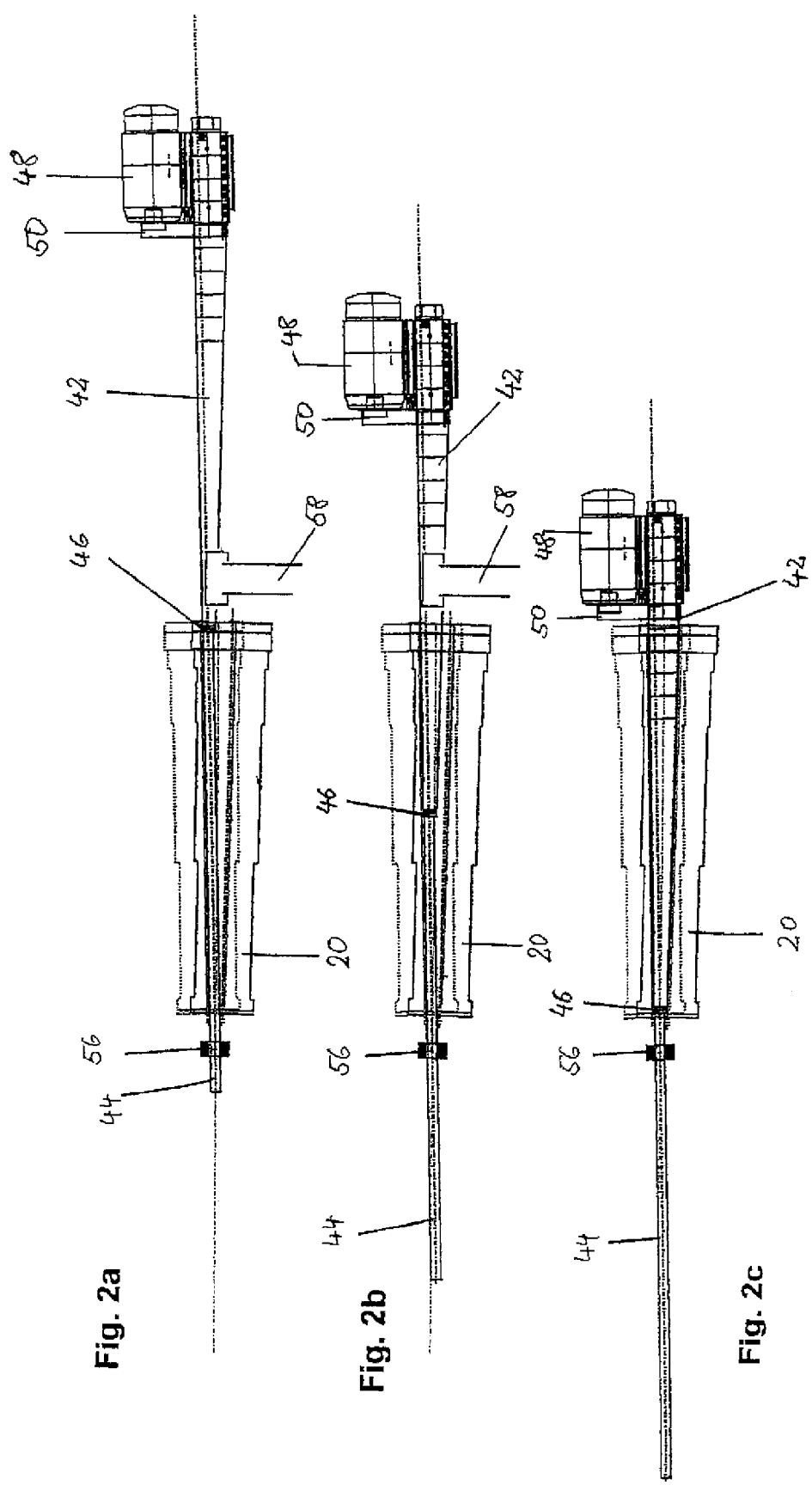

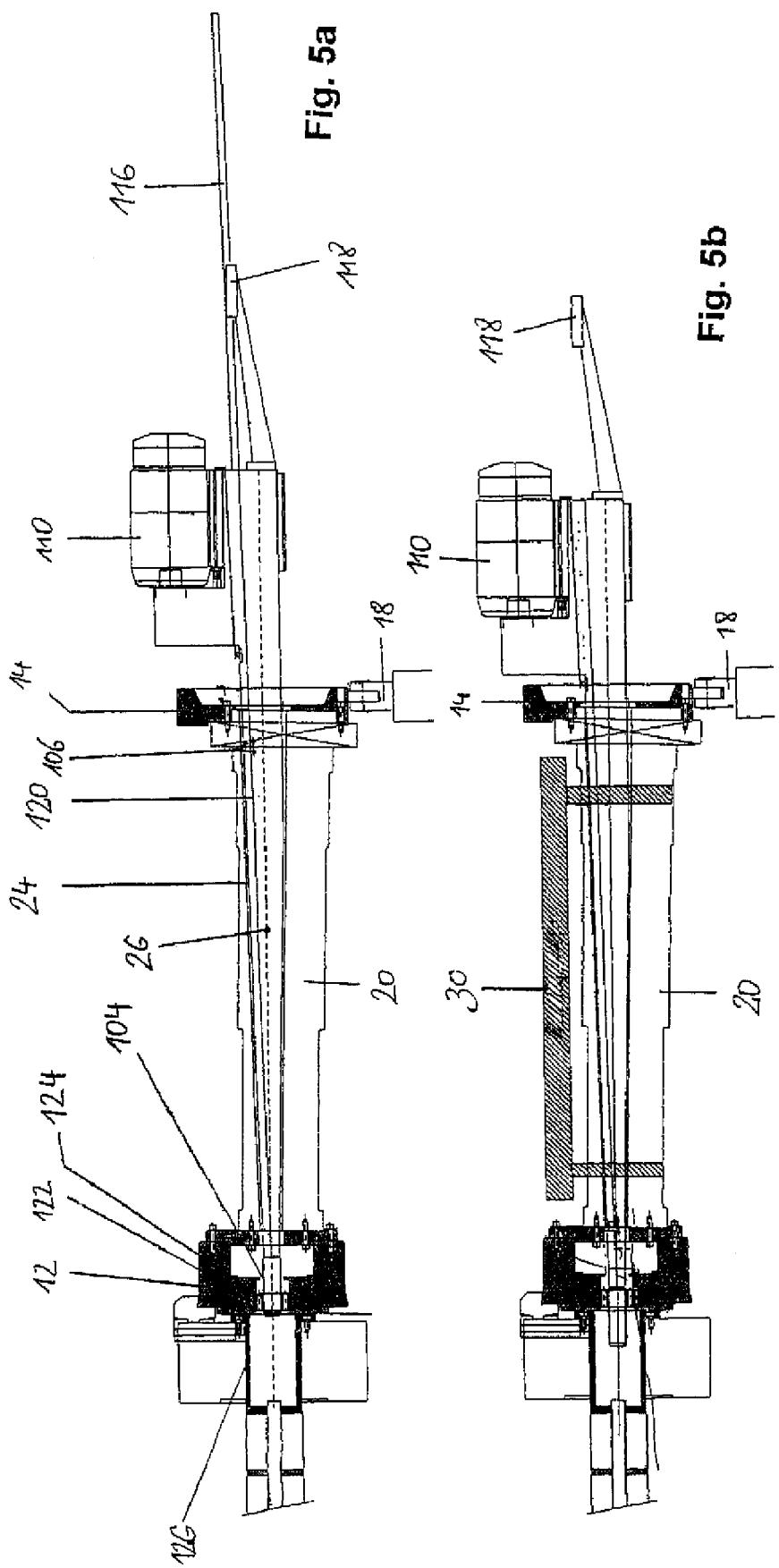

MACHINING APPARATUS FOR MAKING A PLASTICIZING BARREL

CROSS-REFERENCES TO RELATED APPLICATIONS

This application is a continuation of prior filed copending PCT International application no. PCT/EP2005/053514, filed Jul. 20, 2005, which designated the United States and has been published but not in English as International Publication No. WO 2006/010729 and on which priority is claimed under 35 U.S.C. §120, and which claims the priority of German Patent Application, Serial No. 102004036078.2, filed Jul. 24, 2004, pursuant to 35 U.S.C. 119(a)-(d), the contents of which are incorporated herein by reference in its entirety as if fully set forth herein.

BACKGROUND OF THE INVENTION

The present invention relates, in general, to a machining apparatus for making a plasticizing barrel, and more particularly to a machining apparatus for providing a plasticizing barrel with at least one conical bore for accepting a plasticizing screw.

Nothing in the following discussion of the state of the art is to be construed as an admission of prior art.

Conical twin screw extruders typically have converging screw axes as well as a converging screw configuration. As a result of the decrease in the outer diameter, the volume of the C-shaped transport compartments is continuously reduced as the distance to the intake zone increases. This causes a continuous compaction. The conical twin screw can be constructed with sections of different but constant helix angle. As the consequence of the conicity, the screw tip has a reduced diameter so that a smaller screw back pressure is experienced at constant melt pressure as in cylindrical screws.

To date, the manufacture of plasticizing barrels with conical screw bores for such conical twin screw extruders has proven difficult because, on one hand, the screw bores converge conically toward one another in conformity with the configuration of the conical screws, while on the other hand, the bore axes extend to one another.

Plasticizing barrels for conical twin screw extruders are typically manufactured heretofore by firmly clamping the plasticizing barrels and then machining a first cylindrical screw bore by means of a deep drill. Then, a coarse conical configuration is realized by using cutting tools that replicate the conical profile of the screws. Finally, conical grinding tools are used for carrying out fine-machining steps. This manufacturing process takes very long and is not only complex but also cost-intensive while still not resulting in a desired quality of the inside surface of the screw bore.

It would therefore be desirable and advantageous to provide an improved machining apparatus which obviates prior art shortcomings and which allows a manufacture of high-quality plasticizing barrels with conical screw bore.

SUMMARY OF THE INVENTION

According to one aspect of the present invention, a machining apparatus for making a plasticizing barrel includes a clamping device for securing the plasticizing barrel, with the clamping device constructed for rotation about a rotation axis and for off-center acceptance of the plasticizing barrel to thereby cause the plasticizing barrel to wobble about its symmetry axis, when the clamping device rotates, and a machining unit for providing the plasticizing barrel with an internal conical bore for receiving a screw, with the machining unit having a turning tool which is movable linearly back-and-forth in a direction of an axis which extends in relation to the rotation axis at an incline of about half a cone angle of the conical bore, wherein the conical bore being produced has a center line which coincides with the rotation axis.

The present invention resolves prior art problems by the off-center disposition of the plasticizing barrel with respect to it symmetry axis so that the plasticizing barrel is caused to wobble about a rotation axis, when being rotated. The rotation axis corresponds hereby to the later screw bore axis. While the plasticizing barrel rotates, a turning tool is introduced into a previously formed crude bore, whereby the turning tool itself does not rotate but is movable back-and-forth in the direction of an axis which extends in relation to the rotation axis at an incline of about half a cone angle of the conical bore. As a the plasticizing barrel and the turning tool rotate relative to one another and the turning tool bears against the inside of the internal bore to be made, the wobbling motion causes formation of a conical inner surface. The degree of conicity may hereby be predefined by the extent of the off-center securement of the plasticizing barrel.

According to another feature of the present invention, the clamping device may have a first clamping chuck for securing one end of the plasticizing barrel, and a second clamping chuck for securing another end of the plasticizing barrel. The clamping chucks may either be securely fixed to a rotating mounting or held rotatably in a bearing assembly.

According to another feature of the present invention, a balance weight may be provided for compensating an unbalance as a result of the off-center securement of the plasticizing barrel. The balance weight may be secured to the clamping device, or the balance weight may be secured or securable to the plasticizing barrel.

According to another feature of the present invention, the machining unit, which is intended for insertion into the interior of the crude bore of the plasticizing barrel, may have a boring bar for secure attachment of the turning tool so that the turning tool is movable together with the boring bar linearly through an opening of the plasticizing barrel. In this case, the boring bar, and possible other associated elements, have to be supported for linear movement. The linear movement may hereby be realized by a separate drive.

According to another feature of the present invention, the boring bar may be constructed, at least partly or about a circumferential portion, of conical configuration similar to the screw bore being envisioned. As a result, the overall stability is enhanced and the boring bar is supported in the conical bore being made.

In order to further support the boring bar to attain a secure hold, a support device in the form of a support mandrel or other type of support element may be provided on the respective ends of the boring bar outside the plasticizing barrel.

According to another embodiment of the present invention, the machining unit may have a base body in the form of a boring bar, and a drive for linearly moving the turning tool back-and-forth on the boring bar. In this case, the boring bar does not move jointly with the turning tool back-and-forth. Solely the turning tool is moved by a separate drive in linear direction. Suitably, the boring bar has guide and bearing elements for proper support.

According to another feature of the present invention, the drive for the turning tool may hereby be constructed in the form of a spindle-nut assembly or a rack-and-pinion assembly.

In accordance with the present invention, a plasticizing barrel can be formed with a conical screw bore in a simple and rapid manner without the need for special conical tools. Conicity of the internal bore depends solely on the off-center disposition of the plasticizing barrel in the clamping device.

BRIEF DESCRIPTION OF THE DRAWING

Other features and advantages of the present invention will be more readily apparent upon reading the following description of currently preferred exemplified embodiments of the invention with reference to the accompanying drawing, in which:

FIGS. 2a-2c are schematic illustrations of various machining steps for providing the plasticizing barrel with a conical screw bore;

FIG. 5a is a schematic, partially sectional view of a machining apparatus according to the present invention with off-center securement of the plasticizing barrel and a machining unit according to FIG. 3;

FIG. 5b is a schematic, partially sectional view of the machining apparatus of FIG. 5a with depiction of a balance weight.

DETAILED DESCRIPTION OF PREFERRED EMBODIMENTS

Figure 1A:
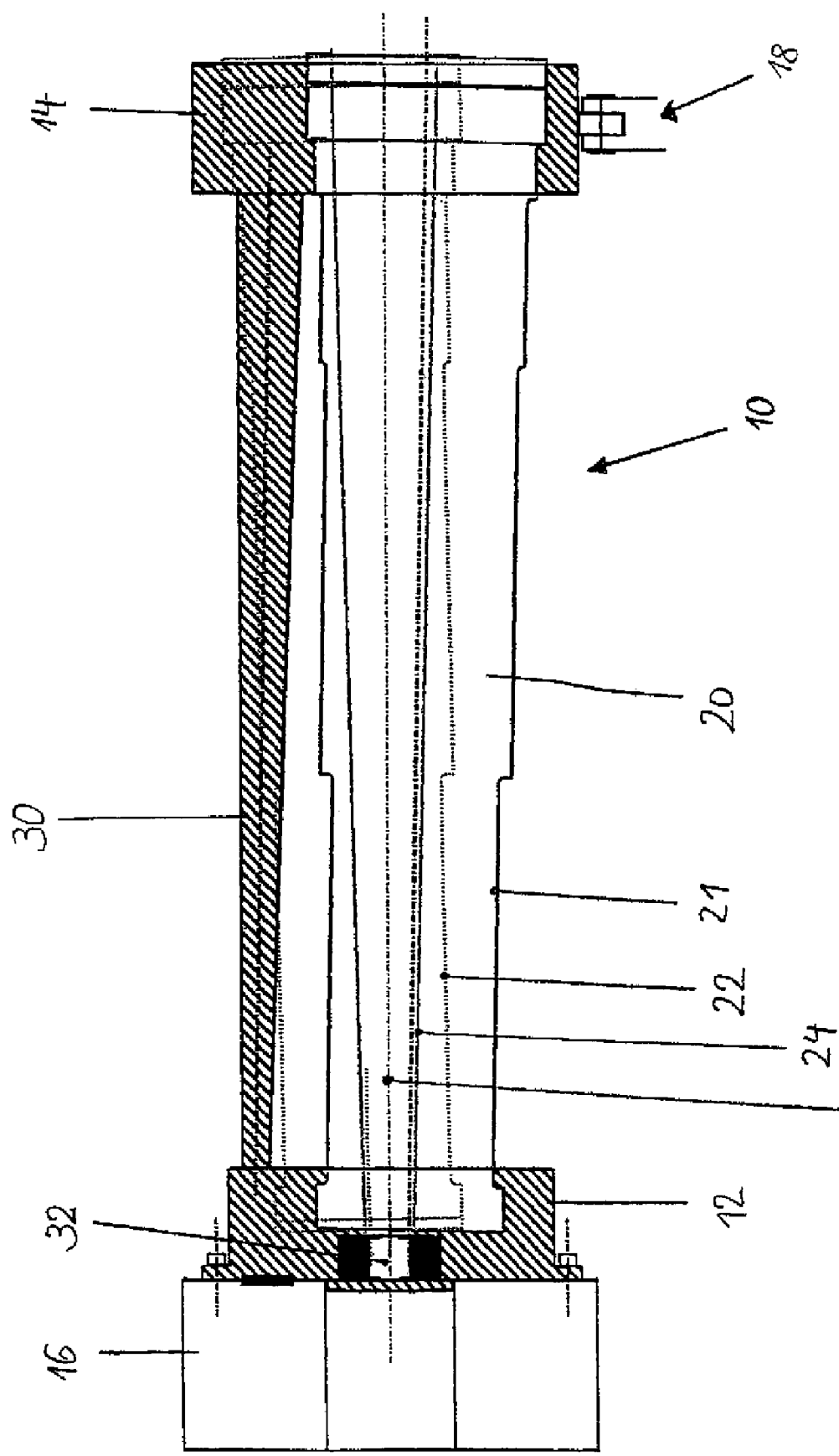
FIG. 1a is a schematic, partially sectional view of a clamping device for an off-center disposition of a plasticizing barrel in accordance with the present invention.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1a, there is shown a schematic, partially sectional view of a clamping device, generally designated by reference numeral 10, for an off-center disposition of a plasticizing barrel 20 in accordance with the present invention. The clamping device 10 includes two clamping chucks 12, 14 in spaced-apart disposition for securing opposite ends of the plasticizing barrel 20 being machined. The off-center acceptance of the plasticizing barrel 20 is shown in FIG. 1a, whereby the continuous line 21 depicts the outline of the plasticizing barrel 20 in a first rotation position, while the dotted line 22 depicts the outline of the plasticizing barrel 20 in a 180° rotated rotation position. Reference numeral 24 designates the intended inner conical configuration for the inner screw bore to be produced, and reference numeral 26 designates the rotation axis about which the plasticizing barrel 20 executes a wobbling motion, when the clamping chucks 12, 14 rotate.

The clamping chuck 14 is rotatably mounted in a bearing assembly 18 which is shown only partially in FIG. 1a. The bearing assembly 18 may be constructed to completely enclose the clamping chuck 14 and to allow a rotation of the clamping chuck 14 in the absence of any axial movement. The clamping chuck 12 is secured to a mounting 16 which is caused to rotate by a not-shown drive. Structure and operation of such a drive for rotating the mounting 16 are known to the artisan so that a detailed description is omitted for the sake of simplicity.

To compensate the unbalance caused by the off-center securement of the plasticizing barrel 20, a balance weight 30 is provided to extend between the clamping chucks 12, 14. The balance weight 30 is shown only schematically for illustrative purposes because the actual configuration depends, of course, on the dimension of the plasticizing barrel 20 as well as on the extent of the off-center disposition.

Figure 1B:
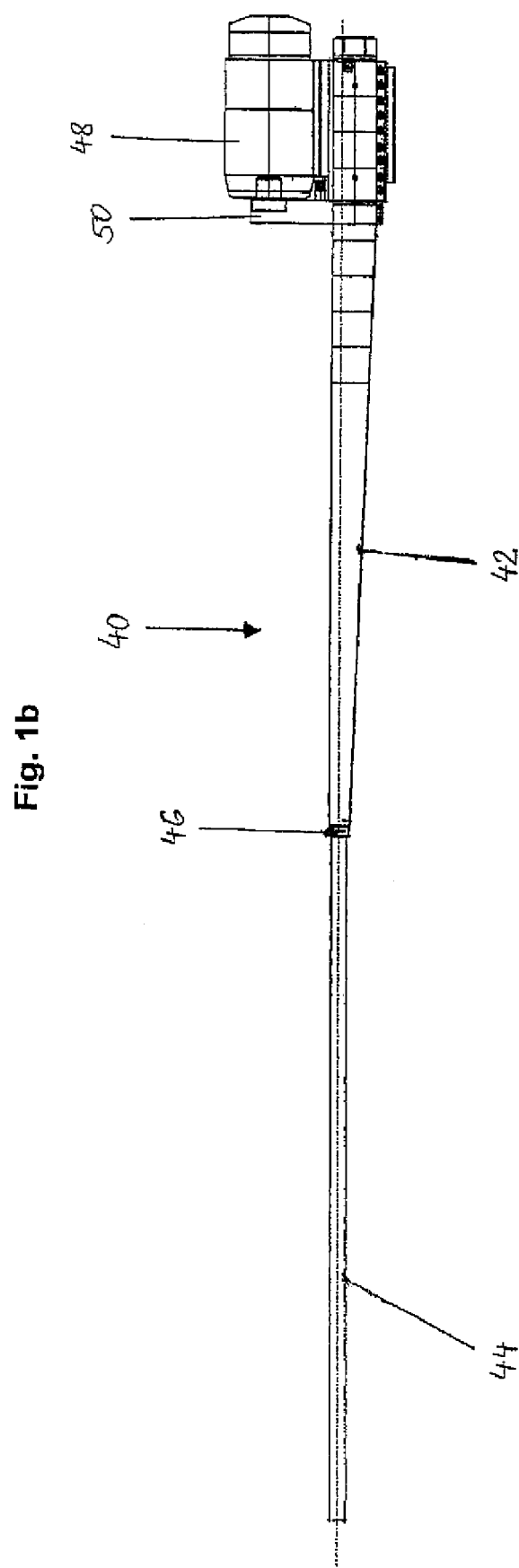
FIG. 1b is a schematic illustration of one embodiment of a machining unit according to the present invention.
Figure 3:
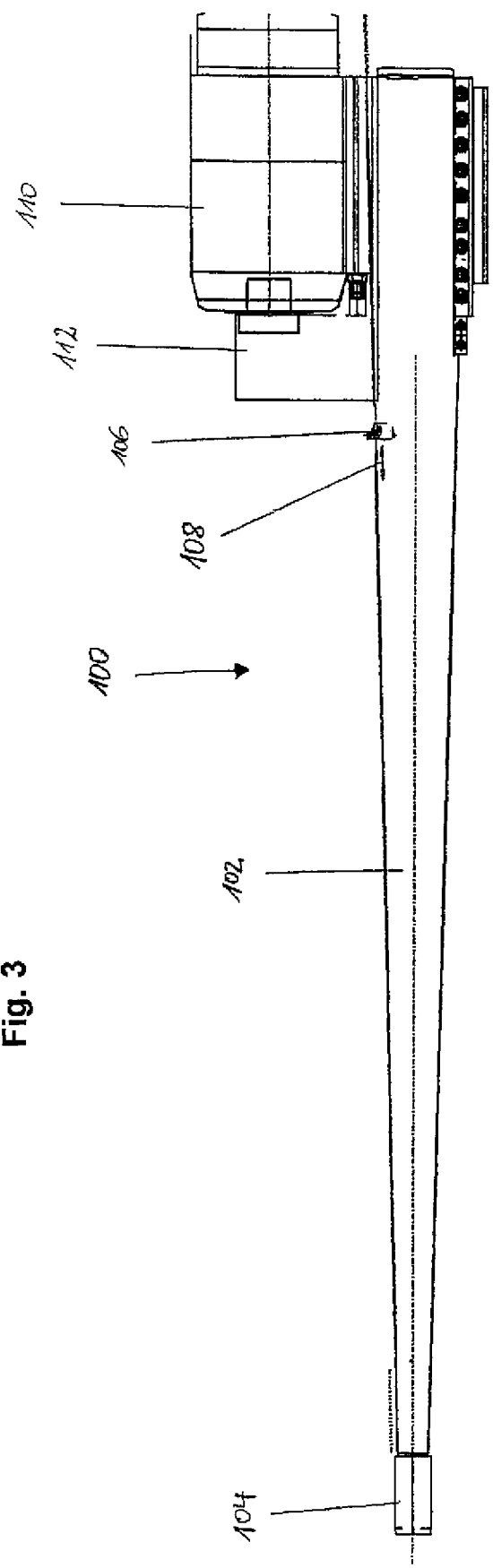
FIG. 3 is a schematic illustration of another embodiment of a machining unit according to the present invention.

Adjacent to the mounting 16, the clamping chuck 12 is formed with a receiving bore 32 for support of a machining apparatus 40, as shown in FIG. 1b, or a machining apparatus 100, as shown in FIG. 3.

The machining apparatus 40 includes a boring bar 42 which is vibration-damped and constructed, at least partially about its circumference with a conicity in correspondence to the conicity of the screw bore being formed. The boring bar 42 has a forward end which is extended by a ground cylindrical support mandrel 44. A turning tool or chisel 64 is securely mounted approximately in a transition area between the boring bar 42 and the support mandrel 44. A drive 48 is mounted to the rear end of the boring bar 42 for linear movement of the arrangement of boring bar 42, support mandrel 44 and turning tool 46, via a driving element 50, not shown in greater detail.

Although not shown in detail, the radial dimension of the turning tool 46 may be adjusted manually (e.g. in the range of 2 mm) using a vernier.

Turning now to FIGS. 2a-2c, there are shown schematic illustrations of various machining steps for providing the plasticizing barrel 20 with a conical screw bore by means of the machining unit 40 in cooperation with the eccentrically arranged and rotatably-driven plasticizing barrel 20. For ease of illustration, clamping chucks 12, 14 and balance weight 30 have not been shown in FIGS. 2a-2c.

As shown in FIG. 2a, the support mandrel 44 is inserted through an opening of the plasticizing barrel 20 into a crude bore, having been formed previously, and juts out from the opposite end of the plasticizing barrel 20. The support mandrel 44 extends hereby also through the receiving bore 32 of the plasticizing barrel 20. For enhancing the overall integrity, the outwardly jutting end of the support mandrel 44 is supported by a support bushing 56, the mounting of which is not shown in greater detail. Likewise the boring bar 42 on the opposite entry side of the plasticizing barrel 20 is held in place by a support device 58. The machining process commences by causing the plasticizing barrel 20 to rotate which thus undergoes a wobbling motion about the rotation axis 26 (FIG. 1).

In the depiction of FIG. 2a, the turning tool 46 assumes a position at the (right) entry side of the inner bore of the plasticizing barrel 20 so that material is removed from the inside of the plasticizing barrel 20 as it turns. The entire machining unit 40 with boring bar 42, support mandrel 44 and turning tool 46 moves continuously to the left to thereby progressively machine the inside contour for formation of the conical bore, as shown in FIG. 2b. After reaching the left end of the plasticizing barrel 20, the conical screw bore has been substantially formed, as shown in FIG. 2c. Optionally, a further fine machining step may be executed in a same manner.

Figure 4:
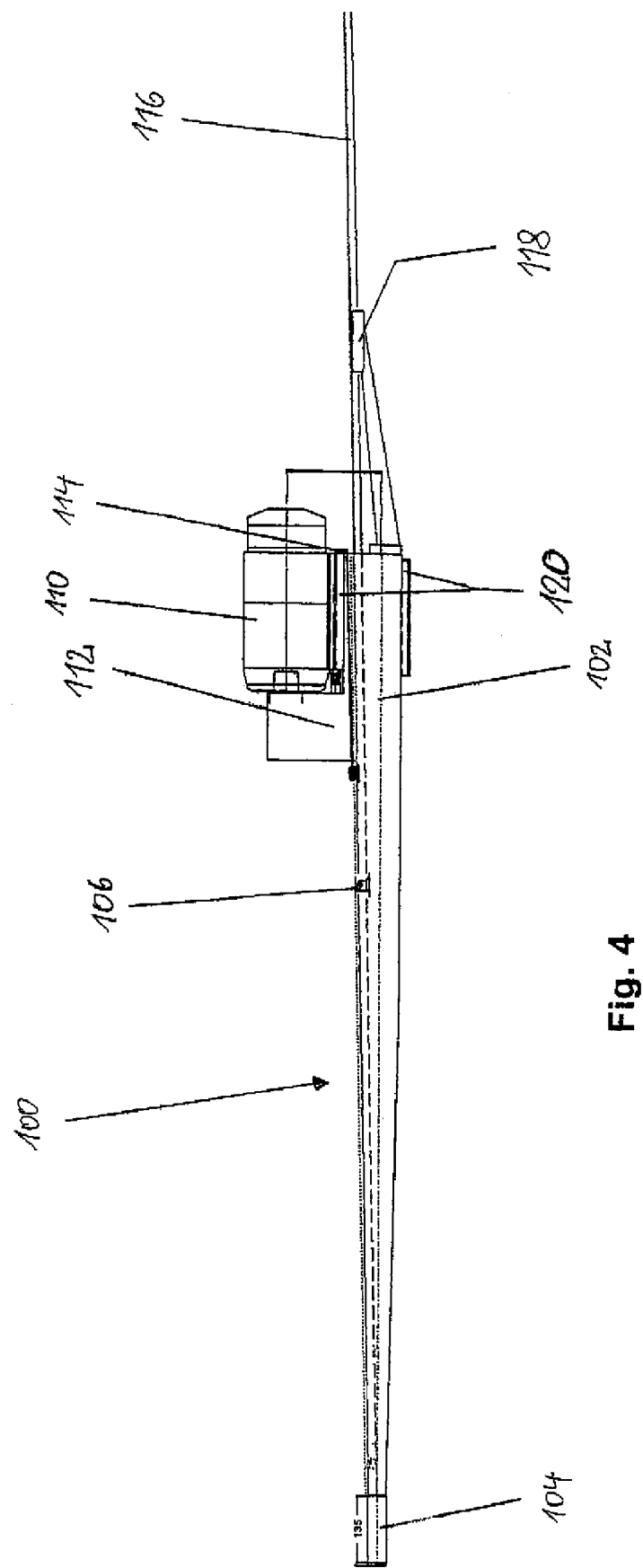
FIG. 4 is a schematic illustration, on a reduced scale, of the machining unit of FIG. 3.

Referring now to FIGS. 3 and 4, there are shown schematic illustrations of another embodiment of a machining unit according to the present invention, generally designated by reference numeral 100. The machining unit 100 differs from the machining unit 40 in that the boring bar 102 is received essentially immobile within the plasticizing barrel 20. The (left) leading end of the boring bar 102 is constructed in the form of a guide pin 104 which is ground and hardened. The guide pin 104 is received in a guide bushing 124 of the clamping chuck 12, as shown in FIG. 5a. A drive 110 is attached via a screwed-on dovetail-type guidance 120 to the (right) trailing end of the boring bar 102. The drive 110 operates a rack 106 through intervention of a gear mechanism 112, shown only schematically, with the rack 116 being guided in a groove of the boring bar 102, as indicated in FIG. 4. The rack 116 has a left-hand end for attachment of a turning tool 106. Operation of the drive 110 causes adjustment of the rack 116 so that the turning tool 106 can be moved linearly back-and-forth. For enhancing stability, a support 118 is suitably provided to underpin the rack 116 at the side of the drive 110 distal to the turning tool 106. Reference numeral 114 designates a coolant supply for flushing the rack 116.

Unlike the machining unit 40, the turning tool 106 of the machining unit 100 moves in relation to the boring bar 102. In other words, only the turning tool 102 executes a movement in the inner bore of the plasticizing barrel 20.

The interaction between the machining unit 100 and the off-center plasticizing barrel 20 is shown in FIGS. 5a and 5b. The plasticizing barrel 20 is held off-center between the clamping chucks 12, 14 and is caused to rotate about the rotation axis 26. The clamping chuck 14 is held by bearing assembly 18. As further shown in FIGS. 5a, 5b, the clamping chuck 12 of the machining unit 100 includes a sliding ring 122 in which the guide bushing 124 is arranged for acceptance of the guide pin 104 of the boring bar 102. A sealing bush 126 is disposed in prolongation of the clamping chuck 12 and suitably connected to a supply line for introduction of water which is fed via the guide bushing 124 into the inner bore of the plasticizing barrel 20. FIG. 5b shows the disposition of the balance weight 30 for compensating the unbalance as a consequence of the off-center securement of the plasticizing barrel 20. For ease of illustration, the balance weight 30 is not shown in FIG. 5a, although it is, of course, a permanent part of the machining unit 100.

Figure 6A:
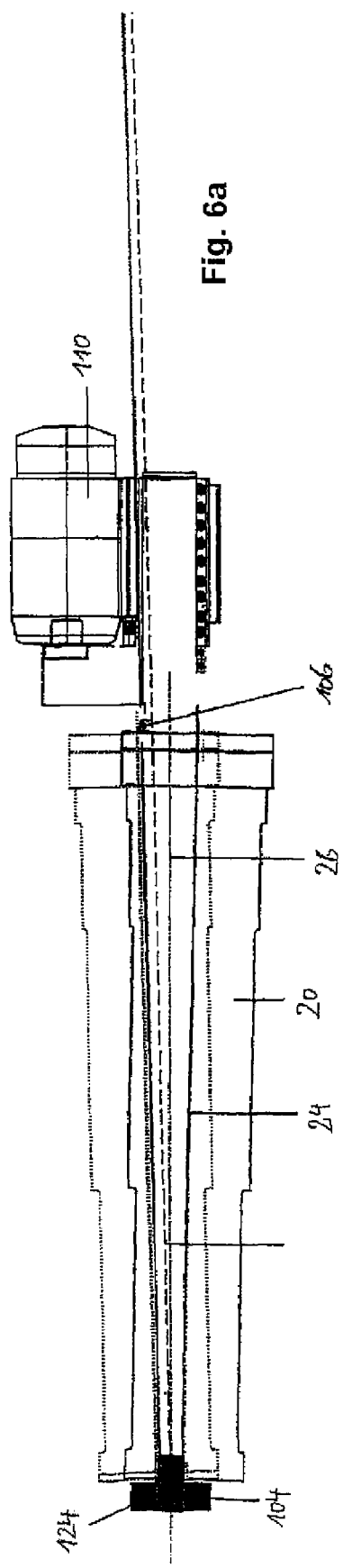
FIGS. 6a-6c are schematic illustrations of various machining steps executed by the machining unit of FIG. 3 for providing the plasticizing barrel with a conical screw bore.
Figure 6B:
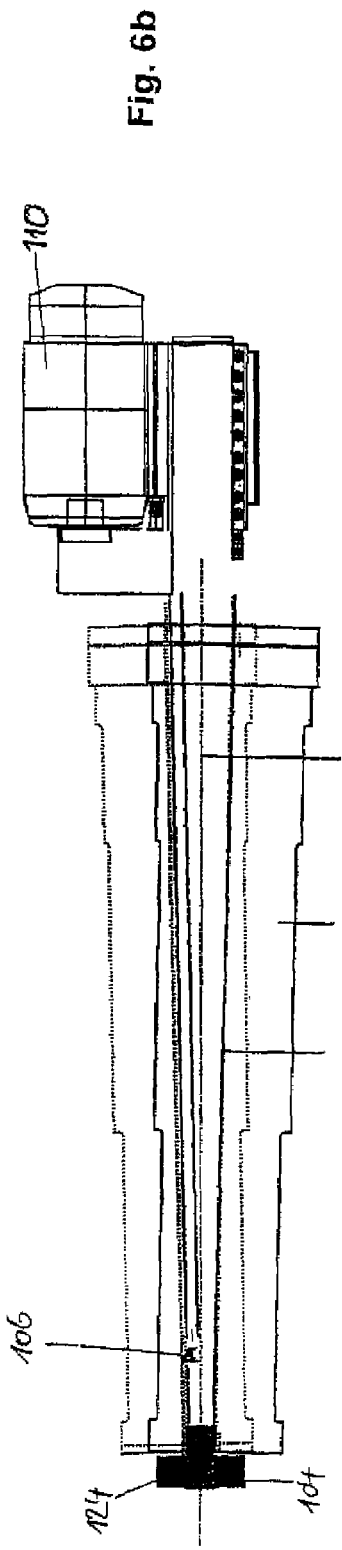
Figure 6C:
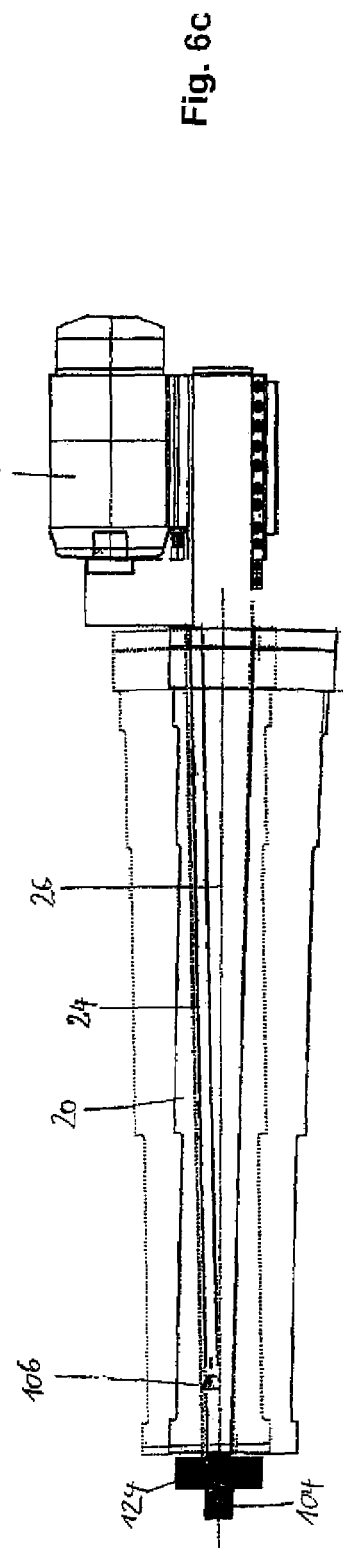

Turning now to FIGS. 6a-6c, there are schematic illustrations of various machining steps by the machining unit 100 of FIG. 3 for transforming the initially crude inner bore of the plasticizing barrel 20 into a screw bore of conical configuration. As shown in FIG. 6a, the boring bar 102 is inserted in the crudely pre-fabricated conical bore of the plasticizing barrel 20, with the turning tool 106 assuming a position at the (right) entry zone of the inner bore. The guide pin 104 is hereby rotatably received in the guide bushing 124. As the plasticizing barrel 20 is caused to rotate, the turning tool 106 moves to the left along the entire length of the plasticizing barrel 20 so as to form the inner contour 24 of the plasticizing barrel 20, as shown in FIGS. 6b and 6c. The rotation of the plasticizing barrel 20 is realized by the motor 110 via the gear mechanism 112 and rack 116. As an alternative, it is, of course, conceivable to apply a different type of drive such as, for example, a spindle drive with spindle and nut combination.

The overall drive with motor 110, gear mechanism 112 and rack 116, and the boring bar 102 remain essentially immobile in axial direction during the machining operation in relation to the plasticizing barrel 20. However, as shown in FIGS. 5b and 6c, the boring bar 102 can be shifted slightly forwards, i.e. to the left in the drawing. This can be recognized in particular by the overhang of the guide pin 104. As a result of this shift, the diameter of the conical bore can be widened within limits so that the diameter is the greatest following the last machining step of FIG. 6c.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A machining apparatus for making a plasticizing barrel, comprising:
   a clamping device for securing a plasticizing barrel which is defined by a symmetry axis, said clamping device constructed for rotation about a rotation axis and for off-center disposition of the plasticizing barrel with respect to the rotation axis to thereby cause the plasticizing barrel to wobble about the symmetry axis, when the clamping device rotates; and
   a machining unit for providing the plasticizing barrel with an internal conical bore, defined by a cone angle, for receiving a screw, said machining unit having a turning tool which is movable linearly back-and-forth in a direction of an axis which extends in relation to the rotation axis at an incline of about half the cone angle of the conical bore, wherein the conical bore being formed by the machining unit has a center line which defines the rotation axis.

2. The machining apparatus of claim 1, wherein the clamping device has a first clamping chuck for securing one end of the plasticizing barrel, and a second clamping chuck for securing another end of the plasticizing barrel.

3. The machining apparatus of claim 2, wherein the first clamping chuck has a bore for support of a support element of the machining unit.

4. The machining apparatus of claim 3, wherein the support element is a support mandrel.

5. The machining apparatus of claim 2, wherein the first clamping chuck has a bearing assembly for support of a support element of the machining unit.

6. The machining apparatus of claim 5, wherein the support element is a bearing pin.

7. The machining apparatus of claim 2, wherein the clamping device has a mounting for rotatably securing at least one of the first and second clamping chucks.

8. The machining apparatus of claim 2, wherein the clamping device has a bearing assembly for rotatably securing at least one of the first and second clamping chucks.

9. The machining apparatus of claim 1, further comprising a balance weight for compensating an unbalance as a result of the off-center securement of the plasticizing barrel.

10. The machining apparatus of claim 9, wherein the balance weight is secured to the clamping device.

11. The machining apparatus of claim 9, wherein the balance weight is constructed for securement to the plasticizing barrel.

12. The machining apparatus of claim 1, wherein the machining unit has a boring bar for attachment of the turning tool so that the turning tool is movable together with the boring bar linearly through an opening of the plasticizing barrel.

13. The machining apparatus of claim 12, wherein the boring bar is constructed, at least partly, of conical configuration.

14. The machining apparatus of claim 12, wherein the machining unit has a support mandrel in prolongation of the boring bar.

15. The machining apparatus of claim 14, wherein the support mandrel is supported within one of the first and second clamping chucks or a mounting for the one of the first and second clamping chucks.

16. The machining apparatus of claim 14, wherein the machining unit has a support bushing for underpinning the support mandrel outside of one of the first and second clamping chucks or a mounting for the one of the first and second clamping chucks.

17. The machining apparatus of claim 12, wherein the machining unit has a support unit for supporting the boring bar outside the plasticizing barrel in proximity of an entry side of the boring bar into the plasticizing barrel.

18. The machining apparatus of claim 1, wherein the machining unit has a base body in the form of a boring bar, and a drive for linearly moving the turning tool back-and-forth on the boring bar.

19. The machining apparatus of claim 18, wherein the base body has one end constructed to form a guide pin for support in one of the first and second clamping chucks or a mounting thereof.

20. The machining apparatus of claim 18, wherein the drive is a spindle-nut assembly.

21. The machining apparatus of claim 18, wherein the drive is a rack-and-pinion assembly.

22. A method of making a plasticizing barrel with at least one conical screw bore, comprising the steps of:
   forming a plasticizing barrel with a crude bore;
   clamping the plasticizing barrel off-center in relation to a symmetry axis;
   rotating the plasticizing barrel to thereby cause the plasticizing barrel to wobble about a rotation axis;
   introducing a non-rotatable turning tool into the crude bore; and
   moving the turning tool along an axis which extends in relation to the rotation axis at an incline of about half a cone angle of a conical bore to be made from the crude bore while the plasticizing barrel rotates about the rotation axis.

* * * * *